March 28, 1961        D. COLLIVA        2,977,276
METHOD AND MACHINE FOR MANUFACTURING ASBESTOS CEMENT TUBES
Filed Aug. 10, 1955        6 Sheets-Sheet 2

INVENTOR
Dante Colliva
BY
ATTORNEY

March 28, 1961  D. COLLIVA  2,977,276
METHOD AND MACHINE FOR MANUFACTURING ASBESTOS CEMENT TUBES
Filed Aug. 10, 1955  6 Sheets-Sheet 3

INVENTOR
Dante Colliva

BY
ATTORNEY

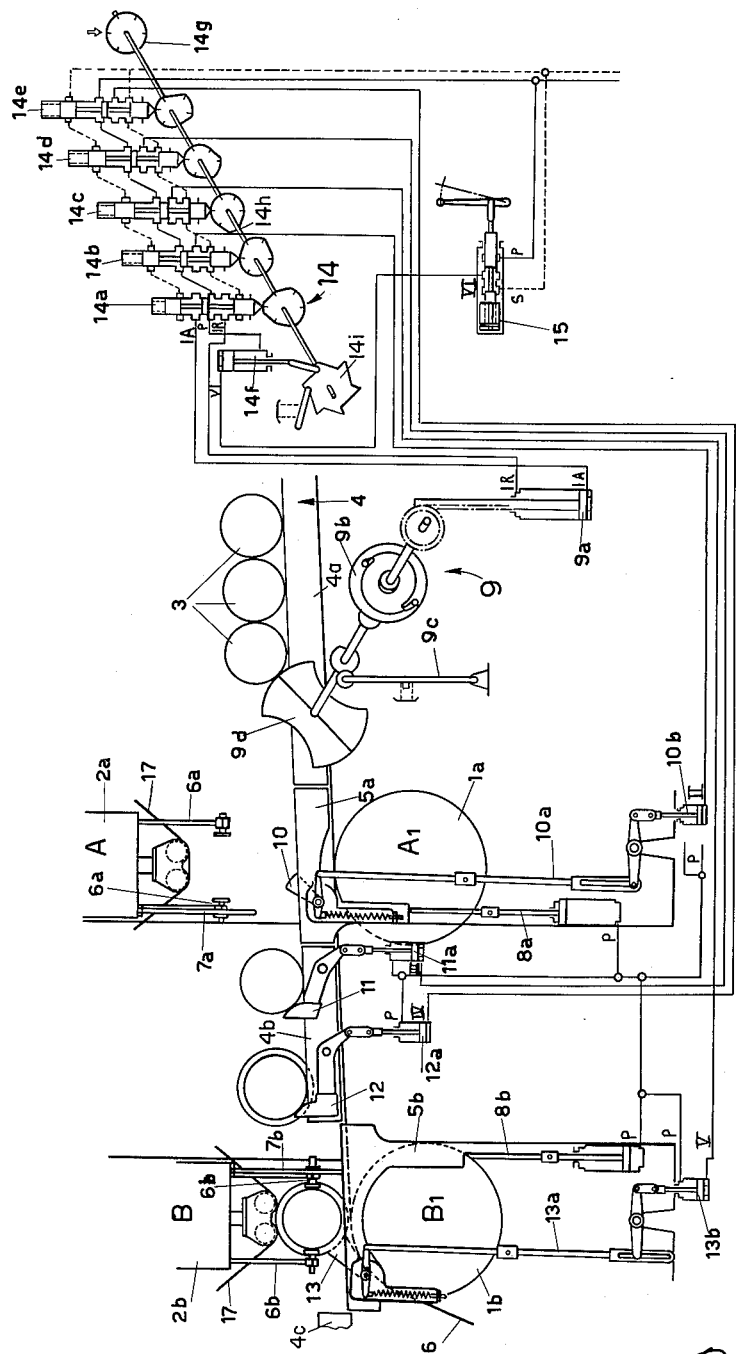

United States Patent Office 2,977,276
Patented Mar. 28, 1961

2,977,276

METHOD AND MACHINE FOR MANUFACTURING ASBESTOS CEMENT TUBES

Dante Colliva, Milan, Italy, assignor, by mesne assignments, to Johns-Manville Corporation, New York, N.Y., a corporation of New York Filed Aug. 10, 1955, Ser. No. 527,466

Claims priority, application Italy Sept. 16, 1954

13 Claims. (Cl. 162—118)

The present invention relates to a machine for manufacturing tubes of asbestos cement, said machine performing a continuous process and being fitted with a device for feeding the collecting cylinders and for unloading them once the formation of the tube is completed.

The machine embodying the invention is characterized in that the feeding and the unloading of the collecting cylinders with respect to two forming units arranged in series and operating alternately, are effected by simply rolling said cylinders along an inclined plane guideway, means being provided for stopping the cylinders at various locations during their advancement along the guideway, said stopping means being preferably actuated by pressure fluid actuated rams operated in the correct sequence by a multiple distributor driven by a camshaft.

Figure 1:
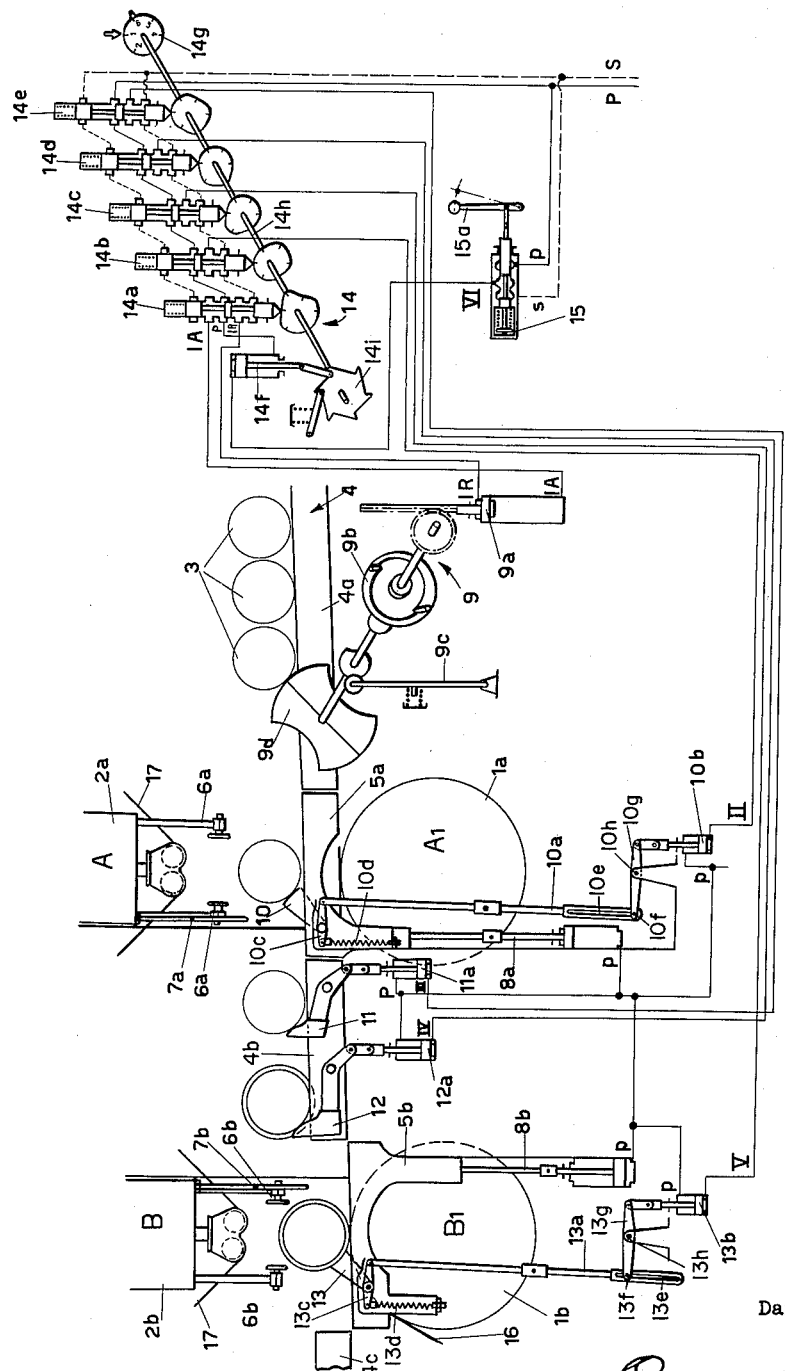

In this way all the collecting cylinders are caused to pass through both forming units as the feed is effected only from one side of the machine while the unloading is effected only from the opposite side. Other features will become apparent from the following description which, by way of example only, makes special reference to one of the possible embodiments of the invention, and which is to be read in connection with the accompanying drawings wherein:

Fig. 1 shows diagrammatically the machine in a first phase or step of its operation; and Figs. 2, 3, 4, 5, 6 show the same machine in the positions coresponding to the successive steps until the operative cycle is completed.

Figure 2:
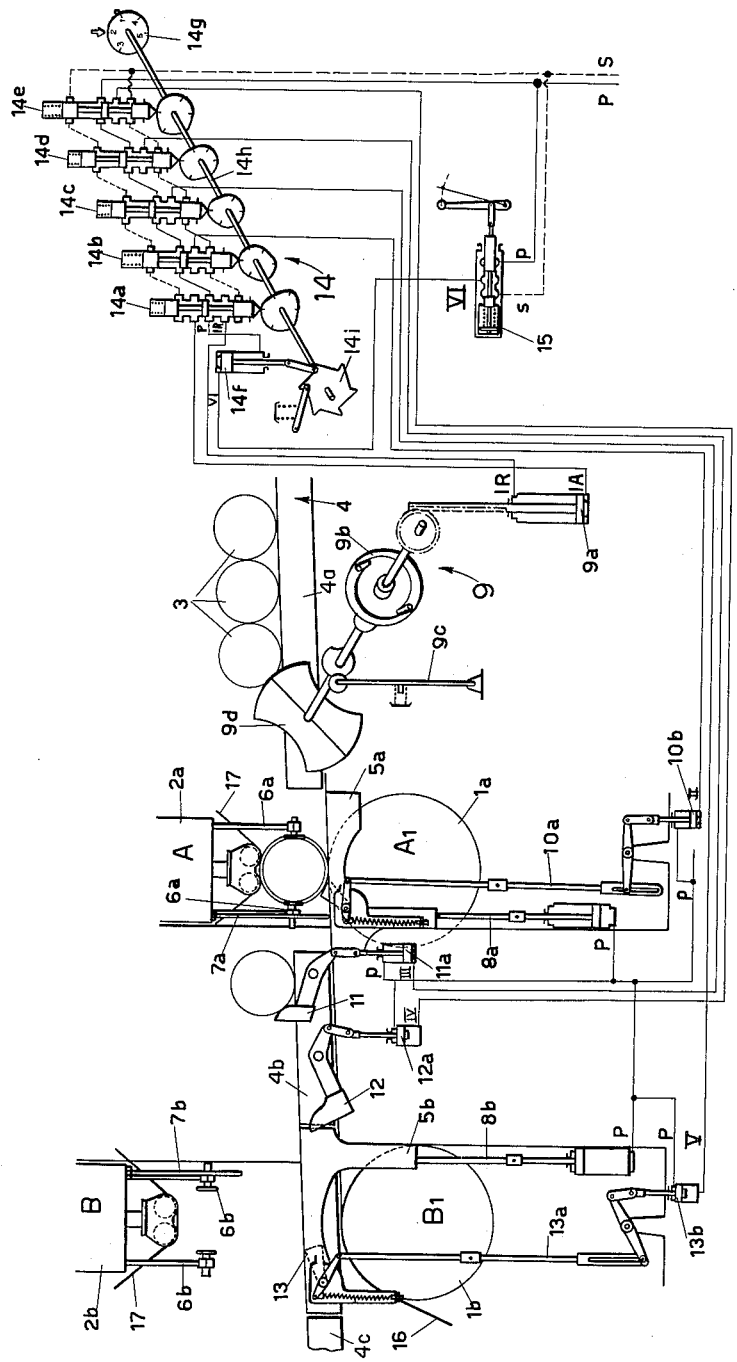

With reference to Fig. 1 of the drawings, A and B diagrammatically designate two movable units, arranged one after the other, and which together with related lower-cylinders $A_1$ and $B_1$ respectively serve to effect the formation of the desired asbestos cement tubes around collecting tubes 3 which advance in succession, in the manner hereinafter described in detail. The tube forming devices are, themselves, of known construction and, for example, each unit may be constructed in accordance with the disclosure in my co-pending, prior application, Serial No. 349,991, filed April 15, 1953, which was issued on August 28, 1956, as Patent No. 2,760,413. The lower cylinders $A_1$ and B, rotate about parallel, spaced-apart, fixed axes, the axis of cylinder $A_1$ being at a higher level than the axis of cylinder $B_1$. The movable unit A associated with lower cylinder $A_1$ includes a vertically movable head 2a having rolls mounted therebeneath and extending parallel to the axis of cylinder $A_1$ so that, when a tube collecting cylinder 3 is disposed between the rolls of head 2a and lower cylinder $A_1$ and the head is lowered (Fig. 2), the rolls of the head and the lower cylinder cooperate, in the usual manner, to compress an applied asbestos-cement paste against the surface of cylinder 3 for forming an asbesto-cement tube on the latter. In order to hold the cylinder 3 against lateral displacement while in rolling contact with the rolls of head 2a and lower cylinder $A_1$ during the forming of a tube on cylinder 3, the head 2a has laterally spaced-apart prongs or abutments 6a depending therefrom and operative to engage diametrically opposed sides of the axle of cylinder 3 when the head 2a is moved to its lowered, operative position (Fig. 2). When the head 2a is raised to its inoperaitve position (Figs. 1, 4, 5 and 6), the prongs 6a are correspondingly raised out of the path of lateral movement of tube forming cylinders 3 to permit lateral movement of such tube forming cylinders into and out of the working space between the rolls of head 2a and the associated lower cylinder $A_1$.

Similarly, the movable unit B includes a vertically movable head 2b having rolls mounted therebeneath to cooperate with cylinder $B_1$ in forming an asbestos-cement tube on a cylinder 3 disposed in the work space under unit B when the head 2b is lowered, and prongs 6b depending from head 2b for laterally positioning a cylinder 3 during the formation of a tube thereon.

The movable units A and B are alternately moved to and from their lowered operative positions by any suitably controlled arrangement (not shown), for example, by pressure fluid actuated rams.

In accordance with the present invention, the empty tube collecting cylinders 3 are fed to both of the series arranged tube forming devices of the machine from one side of the latter, and all of the cylinders 3, with asbestos-cement tubes formed thereon, are moved from the machine at the opposite side of the latter. In order to carry the successive tube collecting cylinders 3 through the machine from right to left, as viewed in Fig. 1, the machine embodying this invention has a guideway 4 which is inclined downwardly from right to left and includes an entry portion 4a receiving the cylinders 3 on which tubes are to be formed and extending to a point adjacent lower cylinder $A_1$, an intermediate portion 4b extending between the lower cylinders $A_1$ and $B_1$, and a discharge portion 4c extending from the lower cylinder $B_1$. The gap between the adjacent ends of the entry portion 4a and the intermediate portion 4b of the guideway is adapted to be occupied by a vertically movable supporting member 5a which, when in its raised position (Fig. 1), forms an inclined continuation of the guideway 4. Similarly, the gap between the adjacent ends of the intermediate and discharge portions 4b and 4c of the guideway is adapted to be occupied by a vertically movable supporting member 5b which, when in its raised position (Figs. 2 and 3), forms an inclined continuation of the guideway 4. As seen in the drawings, the guideway 4 is vertically disposed so that the aligned top edges of the portions 4a, 4b and 4c will lie in an inclined plane which is spaced upwardly from the top surface portions of the lower cylinders $A_1$ and $B_1$ so that, when the axles of the cylinders 3 roll on the guideway 4 and on the raised supporting members 5a and 5b forming continuations thereof, the surfaces of the cylinders 3, or of tubes collected or formed on the latter, will clear the surfaces of the lower cylinders $A_1$ and $B_1$ to permit the advancement of the cylinders 3 along the guideway 4 by gravity without interference from the lower cylinders.

Bars 7a and 7b depend from the heads 2a and 2b, respectively, of the movable units and are adapted to bear down upon and depress the related supporting members 5a and 5b when the heads 2a and 2b are lowered to their operative positions. Thus, when the head 2a or 2b is lowered while a tube collecting cylinder 3 is disposed on the related supporting member 5a or 5b, the supported cylinder 3 is lowered against the surface of the lower cylinder $A_1$ or $B_1$ and is engaged, from above, by the rolls of the vertically movable head. When the head 2a or 2b is again raised following the collecting of an asbestos-cement tube on a cylinder 3, the related supporting member 5a or 5b can then be raised back to the level of the guideway 4 so that the cylinder 3 having a tube collected thereon can be moved off the supporting member for continued advancement along the guideway and so that another tube collecting cylinder can be advanced along the guideway onto the raised supporting member.

In order to effect upward movement of the supporting members 5a and 5b, lift assemblies of pressure fluid operated pistons, piston rods and extensions of the latter 8a and 8b are disposed below the members 5a and 5b, with the piston rods and their extensions being directed vertically to bear upwardly against the related supporting members when pressure fluid is admitted to the lower ends of cylinders containing the pistons of the lift assemblies 8a and 8b.

Figure 5:
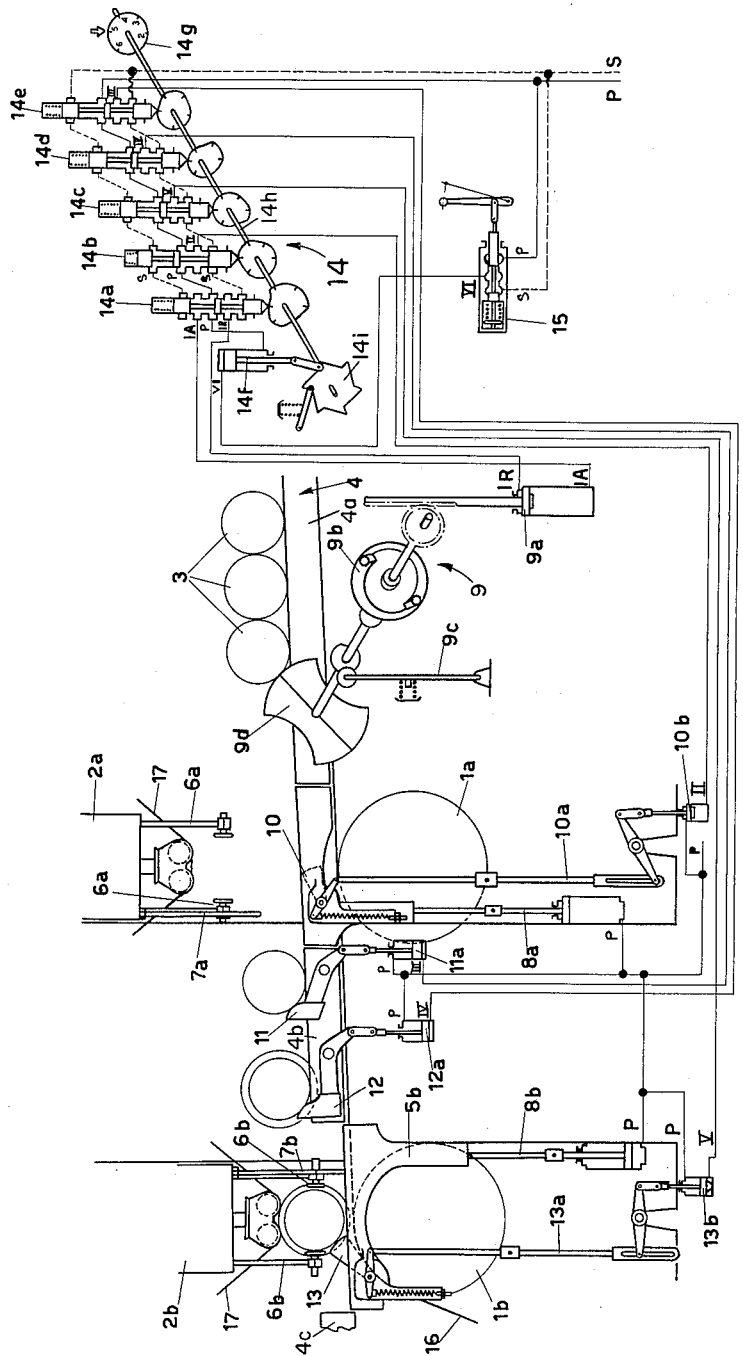

The intermediate portion 4b of the guideway 4 is long enough to simultaneously support two of the tube collecting cylinders 3, as shown in Figs. 1, 5 and 6, so that, following the forming of a tube on a cylinder 3 under the movable unit A, that cylinder with the tube thereon and a bare cylinder 3 can be retained upon the intermediate portion 4b and, when the head 2b is thereafter raised, the cylinder 3 with a tube formed can move from intermediate portion 4b, across supporting member 5b and onto discharge portion 4c, while the bare cylinder 3 can move off intermediate portion 4b onto supporting member 5b to have an asbestos-cement tube formed thereon when the head 2b again descends.

In order to control the movements of the successive cylinders 3 along the portions 4a, 4b and 4c of the guideway and the interposed supporting members 5a and 5b, the machine embodying this invention includes a feeding mechanism 9 associated with the entry portion 4a of the guideway to control the admittance of cylinders 3 to the machine from the entry portion of the guideway, and a series of retractable stop members 10, 11, 12 and 13 which are movable into and out of the path of travel of cylinders 3 on the guideway and the supporting members 5a and 5b.

The feeding mechanism 9 includes a pressure fluid operated piston or ram 9a which is connected to a gear rack meshing with a spur gear, with a free-wheel device or one-way coupling 9b being interposed between that spur gear and a rotatable stop or gate member 9d which has the configuration of a circle with diametrically opposed arcuate cutouts in the periphery thereof. By reason of the one-way coupling 9b, the gate member 9d is rotated only in the counter-clockwise direction, as viewed in the drawings, in response to the reciprocating movement of the piston 9a, and the gear rack connected to piston 9a and the meshing spur gear are relatively dimensioned to provide a 180 degree turn of the gate member during each operating cycle of the piston 9a. In order to hold the gate member 9d against reverse turning during the downward stroke of piston 9a, a yieldable stop or detent 9c is associated with the shaft of the gate member and is sufficiently strong to resist the frictional forces within the one-way coupling 9b, but can be overcome by the force of the pressure fluid actuated piston 9a when that force is transmitted by one-way coupling 9b during the upward stroke of piston 9a.

The retractable stop members 10 and 13 are pivotally mounted on the supporting members 5a and 5b, respectively, and have double-armed levers 10c and 13c fixed with respect thereto. Tension springs 10d and 13d are connected between one end of the levers 10c and 13c, respectively, and the related supporting members to yieldably urge the retractable stop members 10 and 13 to operative positions projecting above the upper edges of the support members 5a and 5b, as in Fig. 1. In order to retract the stop members 10 and 13 below the upper edges of the related supporting members, links 10a and 13a are pivotally connected to the opposite ends of the levers 10c and 13c, respectively, and extend downwardly therefrom. The lower ends of links 10a and 13a are slotted, as at 10e and 13e, to slidably receive pivot pins 10f and 13f carried at one end of rock levers 10g and 13g, respectively, and the latter are pivotally supported intermediate their ends, as at 10h and 13h. Links 10i and 13i are pivotally connected between the rods of pistons 10b and 13b, which are vertically movable within related cylinders by pressure fluid admitted to the latter, and the ends of levers 10g and 13g remote from the pins 10f and 13f, respectively. The several described parts are dimensioned, as shown in Fig. 1, so that, with the supporting member 5a or 5b in its raised position and the piston 10b or 13b at the bottom of its related cylinder, the pin 10f or 13f will be disposed at the bottom end of the related slot 10e or 13e thereby to pull down the link 10a or 13a for retracting the related stop member 10 or 13 when the piston 10b or 13b is thereafter stroked upwardly, for example, as illustrated in Fig. 2 with respect to the stop member 13. The described slotted connection between the levers 10g and 13g and the links 10a and 13a, makes it possible for the stop members 10 and 13 to remain in their operative, projecting positions when the supporting members 5a and 5b are lowered, for example, as illustrated in Figs. 1 and 2 with respect to the stop members 5b and 5a, respectively.

The stop members 11 and 12 are rockably mounted on the intermediate portion 4b of the guideway at locations which are spaced apart in the direction of movement of the cylinders 13 along the guideway and are suitably connected to the rods of pistons 11a and 12a, respectively, which are vertically movable within related cylinders, so that, when the piston 11a or 12a is disposed at the upper end of its cylinder, the related stop member 11 or 12 is retracted below the upper edge of guideway portion 4b, for example, as shown in Fig. 2 with respect to stop member 12, and, when the piston 11a or 12a is moved to the bottom of its cylinder, by pressure fluid admitted to the upper end of the latter, the related stop member 11 or 12 is moved to its operative position projecting above the upper edge of the intermediate portion 4b of the guideway, for example, as shown in Fig. 2 with respect to the stop member 11.

The feeding of pressure fluid, for example, hydraulic fluid under pressure, to the cylinders of lift assemblies 8a and 8b and to the cylinders containing pistons 9a, 10b, 11a, 12a and 13b is controlled by a pressure fluid distributor which is generally identified by the reference numeral 14 and includes a bank of distributing valves 14a, 14b, 14c, 14d and 14e actuated by related cams on a shaft 14h which is rotated in a step-by-step manner by a ratchet mechanism 14i having a drive pawl actuated by a piston 14f movable within a related cylinder by the feeding of pressure fluid to the latter. The feeding of pressure fluid to the cylinder of piston 14f is controlled by a manually actuable slide valve 15 having an operating handle 15a connected therewith so that, each time the handle 15a is moved from its full-line position to the position indicated by a broken line, the piston 14f is stroked downwardly and the ratchet mechanism 14i causes turning of cam shaft 14h through a predetermined angular displacement, for example, an angle of 60 degrees. An indicator 14g is connected to cam shaft 14h and serves to indicate the position of the cam shaft and the related condition of the distributing valves 14a—14e during any operating phase of the machine.

As shown in the drawings, the valve 14a controls the supplying of pressure fluid to the upper and lower ends of the cylinder containing piston 9a of the feeding mechanism, and the supplying of pressure fluid to the lower end of the cylinder containing the piston 14f, while the valves 14b, 14c, 14d and 14e control the supplying of pressure fluid to the lower ends of the cylinders containing pistons 10b, 13b, 12a and 11a, respectively. Further, the upper ends of the cylinders containing pistons 10b, 13b, 12a and 11a and the lower ends of the cylinders of lift assemblies 8a and 8b are all interconnected by suitable ducting, as shown, which is permanently connected to the source of pressure fluid so that the pistons of lift assemblies 8a and 8b are always urged upwardly, and the pistons 10b, 13b, 12a and 11a are moved downwardly when the lower ends of the related cylinders are connected to suction or exhaust by the respective valves 14b, 14c, 14d and 14e. On the other hand, the admission of fluid under pressure to the lower ends of the cylinders containing pistons 10b, 13b, 12a and 11a causes upward movement of the latter in opposition to the pressure of the fluid above the pistons by reason of the fact that the effective upper surface areas of such pistons are reduced by the cross-sectional areas of the related piston rods so that, even if the pressures above and below the pistons are equal, the pressures below the pistons act against relatively larger areas to provide upwardly directed resultant forces. Thus, when any one of the valves 14b, 14c, 14d or 14e of the distributor connects the lower end of the related cylinder to exhaust or suction, the piston 10b, 13b, 12a or 11a, as the case may be, is moved downwardly to cause movement of the related stop member to the operative, projecting position of the latter and, when one of the valves 14b, 14c, 14d or 14e connects the lower end of the related cylinder to the source of pressure, the related stop member is retracted. Further, the pressure of fluid within the cylinders of lift assemblies 8a and 8b acting to raise the supporting members 5a and 5b can be overcome by the force of the rods 7a and 7b during lowering of the heads 2a and 2b, so that, the supporting members 5a and 5b are raised in response to upward movement of the related heads 2a and 2b and are lowered in response to downward movement of the related heads.

The cams on shaft 14h are angularly disposed with respect to each other to provide an operational cycle of the machine involving six sequential phases or steps, each initiated by a displacement of the handle 15a, and characterized by the following described conditions.

Figure 3:
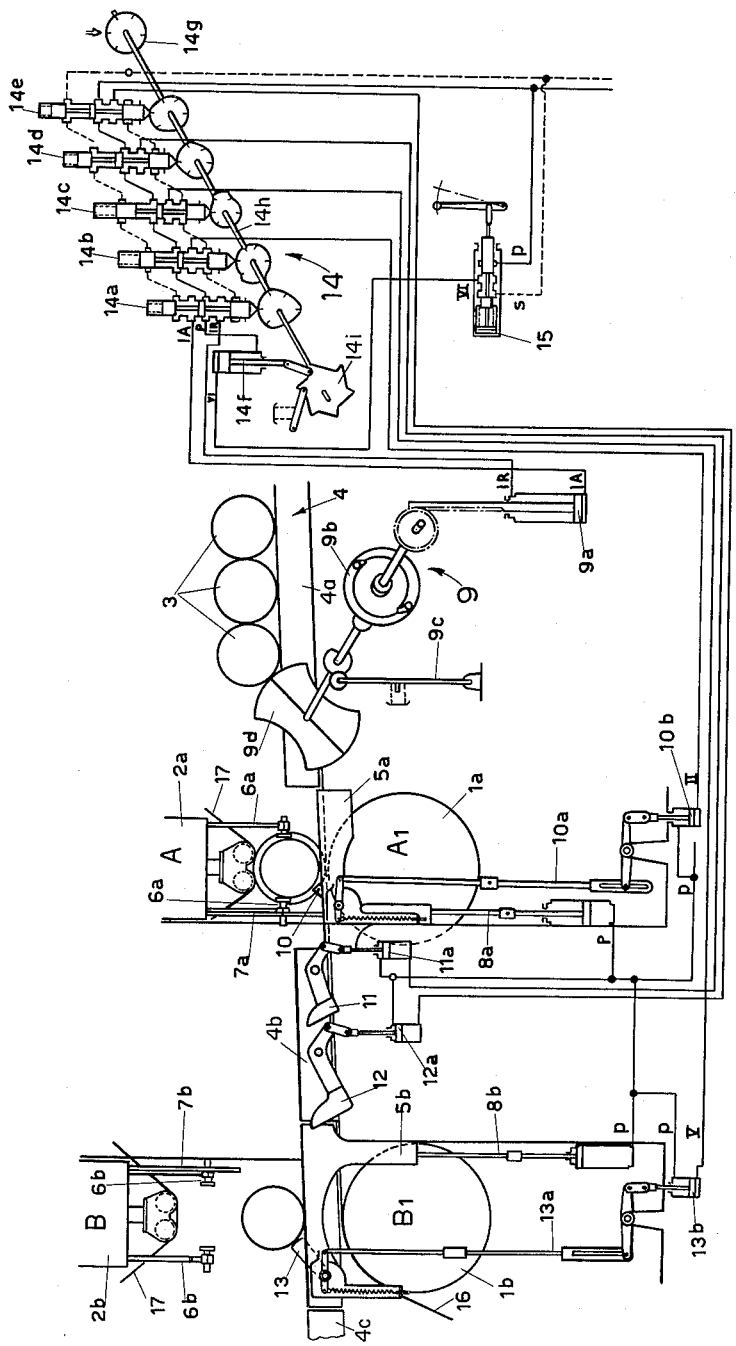

The felt 16 carries the asbestos-cement paste from which the tubes of asbestos-cement are formed and, as clearly illustrated in Figs. 3, 5 and 6, moves through the units A and A₁ and B, B₁. A conventional felt 17 is associated with each of the movable sections of the units A and B.

Fig. 1 shows unit B moving upwardly after a tube is formed thereunder, while a collecting cylinder with the already formed tube of the unit A is stationary against the fourth stop member 12, two empty collecting cylinders are in the machine against the third and the second stop members 11 and 10 respectively, and another cylinder is ready for the forming operation over the lower cylinder A₁. A little before the tube being formed on unit B has reached the desired thickness, the unit A is depressed by actuating the relevant control member (not shown) and thus the formation of the tube on unit A is started. As soon as the tube being formed on the unit B has collected the paste which is on the felt 16 between the two units, thus completing the forming stage, the unit B is lifted thus allowing the supporting member 5b, which had been depressed by the bar 7b, to be returned to the original position by means of the lift assembly 8b thus restoring the continuity of the advance rail. The second stage or step of the operating cycle is performed by acting on the advancement distributor handle 15a which drives the multiple distributor 14.

In the second stage, illustrated in Fig. 2, the formation of the tube on unit A is continued and the fourth and the fifth stop members 12 and 13 are depressed to allow the two cylinders with tubes formed thereon roll by their own weight along the inclined plane constituted by the guideway portion 4b and the supporting member 5b onto portion 4c for discharge from the machine. During this stage preparation of the feeding device 9 also takes place, this preparation occurring due to the downward stroke of piston 9a which imparts a clockwise rotation to the pinion meshing with the rack, but this rotation does not have any influence on the gate member 9d because of the presence of the free-wheel mechanism 9b and of the detent device 9c.

The commencement of the third stage of the operative cycle, is controlled by acting on the handle 15a of the advance distributor 15.

In this third stage, illustrated by Fig. 3, while the formation of tube is continued on unit A, the fifth stopping-up member 13 is lifted and the third stop member 11 is depressed thus allowing the empty collecting cylinder which is in the machine to arrive over the lower cylinder B₁ ready for the formation of a tube thereon when the unit B is depressed.

When the tube being processed on unit A is completed, the unit A is lifted allowing the supporting member 5a to return to its original position due to the action of lift assembly 8a and to restore the continuity of the advance rail or guideway.

Figure 4:
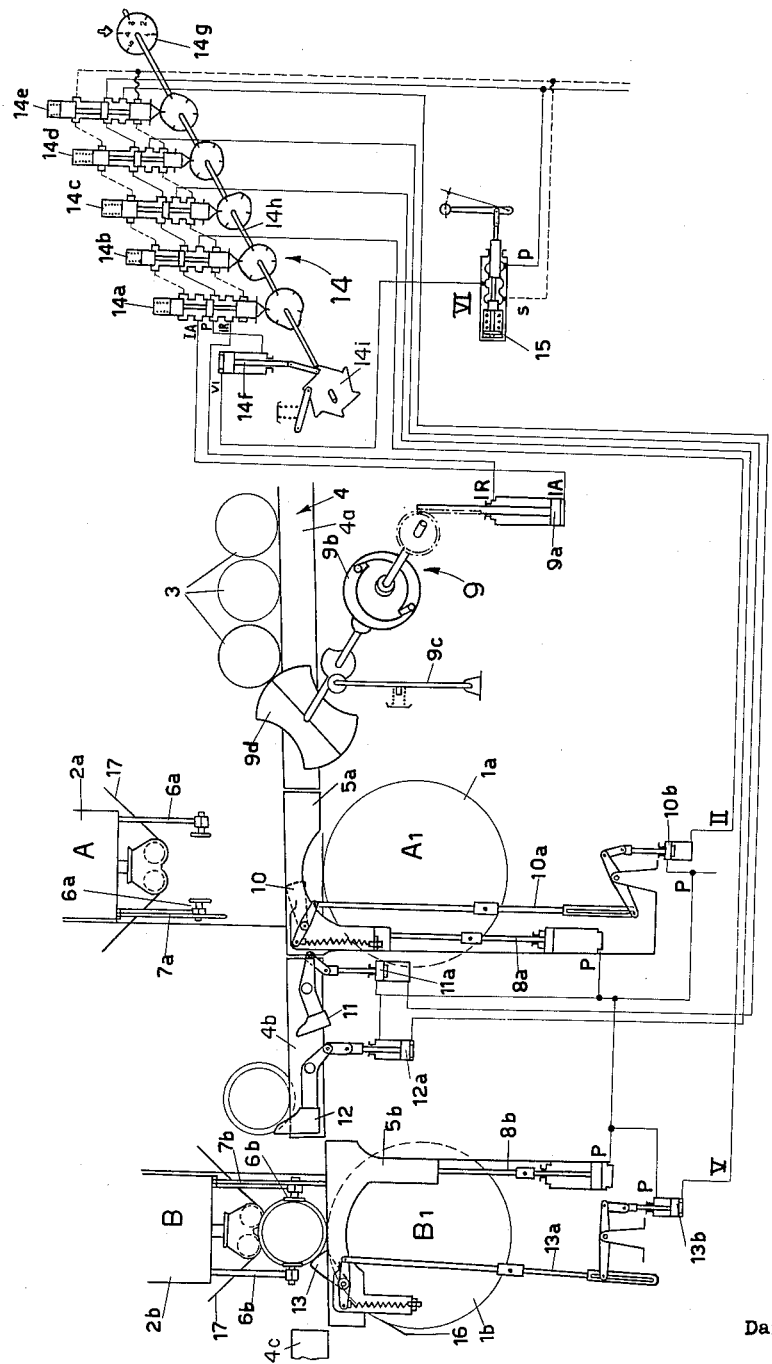

The subsequent operation of the advance distributor 15 starts the fourth stage of the cycle, which is shown in Fig. 4.

In that stage the formation of the tube on unit B is started, and the depression of the second stop member 10 takes place so that the cylinder with the tube formed on unit A is brought against the fourth stop member 12 which has been lifted meanwhile. By again acting on the handle 15a of the advance distributor 15 the subsequent fifth stage of the cycle is started.

In the fifth stage, Fig. 5, the formation of the tube on unit B is continued while the upward stroke of piston 9a imparts a rotation in anticlockwise sense, through 180°, to the gate member 9d thus allowing an empty collecting cylinder to enter the machine and come to rest against the third stop member 11 which had been lifted during the fourth stage.

After the fifth stage the sixth stage takes place due to the operation of the advance distributor 15 as before. In the sixth and last stage, Fig. 6, the second stop member 10 is lifted, the feeding device 9 is reloaded or prepared for operation while unit B continues the formation of the tube.

A new cycle is again started by passing from the sixth stage to the first stage through the operation of the advance distributor 15.

During this operation the gate member 9d, driven by the feeding device 9, effects a rotation through 180° in anticlockwise direction thus allowing a second empty collecting cylinder to enter the machine and to be stopped against the second stop member 10 over the lower cylinder A₁.

What I claim is:

1. In a machine for continuously forming tubes of asbestos-cement on a succession of collecting cylinders; the combination of first and second, alternately operative tube forming devices disposed alongside each other, means defining an inclined guideway extending laterally past said tube forming devices to receive empty collecting cylinders at one side of the machine and to discharge the collecting cylinders, with tubes formed thereon, from the other side of the machine, feeding means disposed adjacent said guideway at said one side of the machine and operative to permit the cylinders on said guideway to enter the machine one by one, first, second, third and fourth stop members disposed at said first tube forming device, at two spaced-apart locations between said first and second tube forming devices and at said second tube forming device, respectively, and being individually movable between operative positions projecting into the rolling path of the collecting cylinders defined by said inclined guideway and retracted positions withdrawn from said rolling path, and means synchronously operating said feeding means and said stop members, in sequence, so that, during the operation of said second tube forming device, a cylinder, with a tube previously formed thereon by said first device, is permitted to roll along said guideway from said first device and is arrested by said third stop member and, thereafter, two successive empty collecting cylinders are permitted to enter the machine and are brought to rest against said second and first stop members, respectively, and so that, during the subsequent operation of said first device to form a tube on the cylinder arrested by said first stop member, the collecting cylinders with tubes formed thereon during previous operations of said second and first devices, respectively, are permitted to roll out of the machine along said guideway and, thereafter, the empty collecting cylinder arrested by said second stop member is permitted to further roll along said guideway and be arrested by said fourth stop member to be then in position for a subsequent operation of said second tube forming device.

2. In a machine for continuously forming tubes of asbestos-cement on a succession of collecting cylinders; the combination as in claim 1, wherein each of said tube forming devices includes a lower cylinder rotating about a fixed axis and a vertically movable head carrying pressure rolls for engagement with a tube collecting cylinder from above and below by said rolls and said lower cylinder, respectively, said head being raised during inoperative periods of the related device to permit the passage therebelow of tube collecting cylinders rolling along said guideway; and wherein said means defining an inclined guideway includes a vertically movable portion at each of said tube forming devices, means yieldably urging each vertically movable portion of the guideway to a normal position aligned with the remainder of the guideway and at a level above the top surface portion of the related lower cylinder so that a tube collecting cylinder rolling on said vertically movable portion of the guideway is held out of contact with said related lower cylinder, and means depending from said vertically movable head to depress the vertically movable portion of the guideway at the related tube forming device in response to downward movement of the head so that a tube collecting cylinder then disposed on said vertically movable portion is then lowered into contact with the related lower cylinder.

3. In a machine for continuously forming tubes of asbestos-cement on a succession of collecting cylinders; the combination as in claim 2, wherein said means synchronously operating said feeding means and said stop members includes a pressure fluid operated drive means connected to said feeding means and a pressure fluid operated actuating means connected to each of said first, second, third and fourth stop members, and distributor means effective to sequentially control the supplying of pressure fluid to said drive means and to the actuating means associated with each of said stop members.

4. In a machine for continuously forming tubes of asbestos-cement on a succession of collecting cylinders; the combination as in claim 3, wherein said distributor means includes distributing valves corresponding to said drive means and to the actuating means of each of said stop members for controlling the supplying of pressure fluid to the related drive means and actuating means, a rotatable shaft, cams on said shaft corresponding to said distributing valves and actuating the latter according to a predetermined sequence in response to step-by-step turning of said shaft, and pressure fluid operated means for effecting the step-by-step rotation of said shaft.

5. In a machine for continuously forming tubes of asbestos-cement on a succession of collecting cylinders; the combination as in claim 3, wherein said feeding means includes a rotatable gate member effective during each angular displacement thereof through 180 degrees to permit the passage of one tube collecting cylinder, and wherein said pressure fluid operated drive means includes a piston reciprocable in a cylinder to which pressure fluid is alternately admitted at opposite sides of said piston therein, a gear rack connected to said piston and meshing with a spur gear, a one-way coupling between said spur gear and gate member for transmitting only the rotation of said spur gear in one direction to said gate member, and yieldable detent means resisting turning of said gate member with said spur gear during rotation of the latter in the opposite direction.

6. In a machine for continuously forming tubes of asbestos-cement on a succession of collecting cylinders; the combination as in claim 1, wherein said means synchronously operating said feeding means and said stop members includes pressure fluid operated drive means for said feeding means and pressure fluid operated actuating means for each of said stop members and normally urging the latter to said operative positions thereof, five pressure fluid distributing valves corresponding to said drive means and to said actuating means of said first, second, third and fourth stop members, respectively, said distributing valves, when actuated, being effective to cause operation of the related drive means and of the related actuating means for permitting a tube collecting cylinder to move along said guideway past said feeding means and for moving the related stop members to the retracted positions of the latter, a cam shaft having cams thereon effective to actuate said distributing valves in a predetermined sequence in response to turning of said shaft, and means for effecting the step-by-step rotation of said cam shaft through six angularly spaced-apart positions which correspond to a complete operating cycle of the machine, said cams being dimensioned and angularly related to each other so that, in a first of said positions of the cam shaft, said stop members all remain in said operative positions thereof and said feeding means is operated; in a second of said positions of the cam shaft, only said third and fourth stop members are moved to their retracted positions; in a third of said positions of the cam shaft, only said second and third stop members are moved to their retracted positions; in a fourth of said positions of the cam shaft, only said first and second stop members are moved to said retracted positions thereof; in a fifth of said positions of the cam shaft, only said first stop member is moved to said retracted position thereof and said feeding means is operated; and in a sixth of said positions of the cam shaft, all of said stop members again reside in said operative positions thereof preparatory to the commencement of a new operating cycle of the machine.

7. In a machine for continuously forming tubes of asbestos-cement on a succession of collecting cylinders; the combination as in claim 1, wherein said means synchronously operating said feeding means and said stop members includes actuating means for operating said feeding means and for moving each of said stop members from its operative position to its retracted position, and control means for said actuating means movable sequentially through six positions which correspond to a complete operating cycle of the machine, said control means being effective, in a first of said positions of the control means, to cause operation of said feeding means while all of said stop members remain in their operative positions; in a second of said positions of the control means, to move only said third and fourth stop members to said retracted positions thereof; in a third of said positions of the control means, to move only said second and third stop members to said retracted positions thereof; in a fourth of said positions of the control means, to move only said first and second stop members to said retracted positions thereof; in a fifth of said positions of said control means, to move only said first stop member to said retracted position thereof and to operate said feeding means; and in a sixth of said positions of the control means, to again dispose all of said stop members in said operative positions thereof preparatory to the commencement of a new operating cycle of the machine.

8. A machine for continuously forming tubes of asbestos-cement comprising an endless felt for carrying an asbestos-cement paste, a plurality of alternately operative tube forming devices, said endless felt passing through each of said tube forming devices and cooperating with each of said tube forming devices so that tubes of asbestos-cement may be formed from the asbestos-cement paste carried by said endless felt, said tube forming devices when operated in proper sequence cooperating to form continuously tubes of asbestos-cement from said asbestos-cement paste carried by said endless felt, means defining a guideway extending laterally past said tube forming devices to receive empty collecting cylinders at one side of the guideway and to discharge the collecting cylinders, with tubes of asbestos-cement formed thereon, from the other side of the guideway, means adjacent said one side of the guideway for successively feeding collecting cylinders to said guideway for movement thereover, a plurality of stop means disposed along said guideway, said stop means being operable to arrest the movement of said cylinders along said guideway, between said tube forming devices and at said tube forming devices, means for operating said feeding means and said stop means so that said collecting cylinders are fed to said guideway and are positioned along said guideway and at said tube forming devices in predetermined sequence so that tubes of asbestos-cement may be formed thereon, each of said collecting cylinders moving over the complete guideway and between each of said tube forming devices, means associated with each of said tube forming devices and said guideway for moving one of said collecting cylinders into a position so that said tube forming device may form a tube of asbestos-cement on said one of said collecting cylinders from the asbestos-cement paste carried by said endless felt, and means for operating said tube forming devices in sequence so that tubes of asbestos-cement may be formed by one or the other of said tube forming devices on each of said collecting cylinders, prior to its discharge from said guideway by one or the other of said tube forming devices, whereby tubes of asbestos-cement may be continuously formed by said machine from said asbestos-cement paste carried by said endless felt.

9. A machine for continuously forming tubes of asbestos-cement comprising an endless felt for carrying an asbestos-cement paste, a plurality of alternately operative tube forming devices, said endless felt passing through each of said tube forming devices and cooperating with each of said tube forming devices so that tubes of asbestos-cement may be formed from the asbestos-cement paste carried by said endless felt, said tube forming devices when operated in proper sequence cooperating to form continuously tubes of asbestos-cement from said asbestos-cement paste carried by said endless felt, a guideway defined by a plurality of separate sections, said sections adjacent each of said tube forming devices being movable, said guideway extending laterally past said tube forming devices to receive collecting cylinders at one side of the guideway and to discharge the collecting cylinders, with tubes of asbestos-cement formed thereon, from the other side of the guideway, means adjacent said one side of the guideway for successively feeding collecting cylinders to said guideway for movement thereover, a plurality of stop means disposed along said guideway, said stop means operable to arrest the movement of said cylinders along said guideway, between said tube forming devices and at said tube forming devices, means for operating said feeding means and said stop means so that said collecting cylinders are fed to said guideway and are positioned along said guideway and at said tube forming devices in predetermined sequence so that tubes of asbestos-cement may be formed thereon, means associated with each of said tube forming devices for moving said movable sections of said guideway to move one of said collecting cylinders into operative position with an associated one of said tube forming devices so that said tube forming device may form a tube of asbestos-cement on said one of said collecting cylinders, and means for operating said tube forming devices in predetermined sequence so that tubes of asbestos-cement may be formed on each of said collecting cylinders, prior to its discharge from said guideway by one or the other of said tube forming devices, whereby tubes of asbestos-cement may be continuously formed by said machine from said asbestos-cement paste carried by said endless felt.

10. A machine for continuously forming tubes of asbestos-cement comprising a plurality of alternately operative tube forming devices, a guideway defined by a plurality of separate sections, said guideway extending laterally past said tube forming devices to receive empty collecting cylinders at one side of the machine and to discharge the collecting cylinders, with tubes of asbestos-cement formed thereon, from the other side of the machine, each of said tube forming devices comprising a lower cylinder rotating about a fixed axis over which passes a felt carrying an asbestos-cement paste and a movable head carrying pressure rolls so that a tube of asbestos-cement may be formed on a collecting cylinder positioned between said lower cylinder and said pressure rolls, means adjacent said one side of the machine for successively feeding collecting cylinders to said guideway for movement thereof, a plurality of stop means disposed along said guideway, said stop means being operable to arrest the movement of said cylinders along said guideway, means movably supporting one of said sections adjacent one of said tube forming devices, means yieldably urging said one section to a normal position aligned with the remaining sections of said guideway, means on the associated head of said one of said tube forming devices for moving said one section to a position whereby said one tube forming device may form a tube of asbestos-cement on one of said collecting cylinders, and means for operating said feeding means and said stop means so that the collecting cylinders are positioned along said guideway and at said tube forming devices in proper sequence so that tubes of asbestos-cement may be formed thereon by said tube forming devices and so that tubes of asbestos-cement may be continuously formed by said machine.

11. A machine for continuously forming tubes of asbestos-cement comprising a plurality of alternately operative tube forming devices, an inclined guideway defined by a plurality of separate sections, said guideway extending laterally past said tube forming devices to receive collecting cylinders at one side of the machine and to discharge the collecting cylinders, with tubes of asbestos-cement formed thereon, from the other side of said machine, each of said tube forming devices comprising a lower cylinder rotating about a fixed axis over which passes a felt carrying an asbestos-cement paste and a movable head carrying press rolls so that a tube of asbestos-cement may be formed on a collecting cylinder positioned between said lower cylinder and said press rolls, means adjacent said one side of said machine for successively feeding collecting cylinders to said inclined guideway for movement thereover, a plurality of stop means disposed along said guideway, said stop means being operable to arrest the movement of said cylinders along said guideway, means movably supporting the sections of said guideway adjacent said tube forming devices, means yieldably urging each of said movable sections to a normal position aligned with the remaining sections of said guideway, a stop member associated with each of said movable sections for movement therewith, said stop members on said movable sections selectively retaining a collecting cylinder thereon, means on each associated head of each of said tube forming devices for moving the associated movable section to a position whereby a tube of asbestos-cement may be formed on a collecting cylinder thereon, and means for operating said feeding means and stop means so that the collecting cylinders are positioned along said guideway and at said tube forming devices; positioning a first plurality of collecting cylincement may be formed by said tube forming devices and so that tubes of asbestos-cement may be continuously formed by said machine.

12. A method for continuously forming tubes of asbestos-cement by a plurality of tube forming devices each being actuatable into a tube forming and a non-tube forming position and comprising at least a first and a second tube forming device, said method comprising: continuously moving a felt having a layer of asbestos-cement paste thereon through said first and second tube forming devices; positioning a first plurality of collecitng cylinders adjacent said second tube forming device; said first plurality of collecting cylinders comprising a first collecting cylinder at said second tube forming device with said second tube forming device in tube forming position, a second collecting cylinder with a tube of asbestos-cement formed thereon positioned adjacent said second tube forming device, and a third collecting cylinder positioned between said second collecting cylinder and said first tube forming device; positioning a second plurality of collecting cylinders adjacent said first tube forming device; said second plurality of collecting cylinders comprising a fourth collecting cylinder at said first tube forming device with said first tube forming device in non-tube forming position, and at least a fifth and a sixth collecting cylinder adjacent said first tube forming device; actuating said first tube forming device into tube forming position so as to form a tube of asbestos-cement on said fourth collecting cylinder; actuating said second tube forming device into non-tube forming position; moving said first collecting cylinder with a tube of asbestos-cement formed thereon from said second tube forming device to a collecting station; moving said second collecting cylinder through said second tube forming device to said collecting station; moving said third collecting cylinder to a position at said second tube forming device; actuating said first tube forming device into non-tube forming position and said second tube forming device into tube forming position so as to form an asbestos-cement tube on said third collecting cylinder; moving said fourth collecting cylinder with a tube of asbestos-cement formed thereon to a position between said first and second tube forming devices; moving said fifth collecting cylinder to a position between said fourth collecting cylinder with the tube of asbestos-cement formed thereon and said first tube forming device; moving said sixth collecting cylinder to a position at said first tube forming device with said first tube forming device in non-tube forming position; and repeating said method so that tubes of asbestos-cement are continuously formed by said first and second tube forming devices from the layer of asbestos-cement paste carried by said continuously moving felt.

13. A method for continuously forming tubes of asbestos-cement by a plurality of tube forming devices each being actuatable into a tube forming and a non-tube forming position and comprising at least a first and a second tube forming device, said method comprising: continuously moving a felt having a layer of asbestos-cement paste thereon through said first and second tube forming devices; positioning a first plurality of collecting cylinders adjacent said second tube forming device; said first plurality of collecting cylinders comprising a first collecting cylinder at said second tube forming device with said second tube forming device in tube forming position, a second collecting cylinder with a tube of asbestos-cement formed thereon positioned adjacent said second tube forming device, and a third collecting cylinder positioned between said second collecting cylinder and said first tube forming device; positioning a second plurality of collecting cylinders adjacent said first tube forming device; said second plurality of collecting cylinders comprising a fourth collecting cylinder at said first tube forming device with said first tube forming device in non-tube forming position, and at least a fifth and a sixth collecting cylinder adjacent said first tube forming device; actuating said first tube forming device into tube forming position so as to form a tube of asbestos-cement on said fourth collecting cylinder; actuating said second tube forming device into non-tube forming position; moving said first collecting cylinder with a tube of asbestos-cement formed thereon from said second tube forming device to a collecting station; moving said second collecting cylinder through said second tube forming device to said collecting station; moving said third collecting cylinder to a position at said second tube forming device; actuating said first tube forming device into non-tube forming position and said second tube forming device into tube forming position so as to form an asbestos-cement tube on said third collecting cylinder; moving said fourth collecting cylinder with a tube of asbestos-cement formed thereon to a position between said first and second tube forming devices; moving said fifth collecting cylinder through said first tube forming device to a position between said fourth collecting cylinder with a tube of asbestos-cement formed thereon and said first tube forming device; moving said sixth collecting cylinder to a position at said first tube forming device with said first tube forming device in non-tube forming position; and repeating said method so that tubes of asbestos-cement are continuously formed by said first and second tube forming devices from the layer of asbestos-cement paste carried by said continuously moving felt.

References Cited in the file of this patent

UNITED STATES PATENTS

| 1,497,344 | Parker | June 10, 1924 |
| 1,608,564 | Parker | Nov. 30, 1926 |
| 1,635,458 | Brown et al. | July 12, 1927 |
| 1,651,407 | Parker | Dec. 6, 1927 |
| 2,043,956 | Camerota | June 9, 1936 |
| 2,266,972 | Holmquist | Dec. 23, 1941 |
| 2,294,277 | Cann | Aug. 25, 1942 |
| 2,767,445 | Taccone | Oct. 23, 1956 |

FOREIGN PATENTS

| 373,240 | Great Britain | May 17, 1932 |
| 636,500 | Great Britain | May 3, 1950 |
| 438,408 | Italy | Aug. 6, 1948 |

UNITED STATES PATENT OFFICE
CERTIFICATE OF CORRECTION

Patent No. 2,977,276            March 28, 1961

Dante Colliva

It is hereby certified that error appears in the above numbered patent requiring correction and that the said Letters Patent should read as corrected below.

Column 1, line 28, for "preferaby" read -- preferably --; line 43, for "coresponding" read -- corresponding --; column 11, line 1, for "devices; positioning a first plurality of collecting cylin-" read -- devices in proper sequence so that tubes of asbestos- --.

Signed and sealed this 14th day of November 1961.

(SEAL)
Attest:

ERNEST W. SWIDER
Attesting Officer

DAVID L. LADD
Commissioner of Patents
USCOMM-DC